US007832266B1

(12) United States Patent
McElvain, Sr.

(10) Patent No.: US 7,832,266 B1
(45) Date of Patent: Nov. 16, 2010

(54) RESIN WEATHERVANE SYSTEM

(76) Inventor: William H. McElvain, Sr., 1320 Main Rd., Eddington, ME (US) 04428

( * ) Notice: Subject to any disclaimer, the term of this patent is extended or adjusted under 35 U.S.C. 154(b) by 87 days.

(21) Appl. No.: 12/287,247

(22) Filed: Oct. 6, 2008

Related U.S. Application Data

(60) Provisional application No. 60/998,705, filed on Oct. 11, 2007.

(51) Int. Cl.
*A63B 53/00* (2006.01)

(52) U.S. Cl. .................................................. 73/170.01

(58) Field of Classification Search ....................... None
See application file for complete search history.

(56) References Cited

U.S. PATENT DOCUMENTS 2,447,224 A * 8/1948 Akerman ................ 73/170.05
2,935,872 A * 5/1960 Misner ................... 73/170.07
4,107,989 A * 8/1978 Peters .................... 73/170.07
4,764,090 A * 8/1988 Danson ...................... 416/17
4,930,436 A * 6/1990 Newman ................ 73/170.05
7,117,735 B2 * 10/2006 Shoemaker et al. ...... 73/170.01
2009/0314078 A1 * 12/2009 Cornett et al. .......... 73/170.11

* cited by examiner

*Primary Examiner*—Andre J Allen

(57) ABSTRACT

A resin weathervane having a weathervane tube mounted within a resin weathervane figurine with stabilizing support rods coupled to an upper portion of the weathervane tube and a belt of fiberglass material wrapped at least partially around the tube and the stabilizing support rods wherein a resin mixture poured into a mold forms a resin weathervane of a desired configuration with the resin bonding the tube, the stabilizing support rods and the fiberglass wrap.

9 Claims, 2 Drawing Sheets

Figure 1:
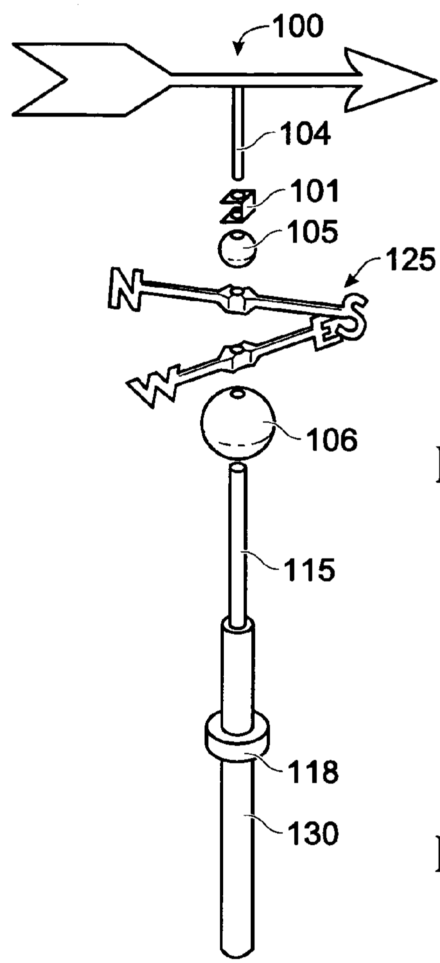

145
116
140

RESIN WEATHERVANE SYSTEM

BACKGROUND OF THE INVENTION

This is a regular patent application that is being timely filed within the time period allotted from a Provisional Application entitled Resin Weathervane System (Method and Apparatus) as filed on Oct. 11, 2007 having the same inventor as hereof, and awarded Ser. No. 60/998,705.

FIELD OF THE INVENTION

This invention relates to decorative weathervanes of an improved construction. Both an apparatus and a method are disclosed. More specifically, the field of this invention relates to a resin weathervane structure that has improved internal strengthening members and a novel method of forming the weathervane with improved strength and durability.

Explanation of Terms

Set out below are brief descriptions of certain relevant terms which further the understanding of the invention. These terms provide a basis for a detailed teaching of the improvements of this invention in the relevant arts. Such terms are not intended to replace the claims but rather serve as helpful guides in understanding my novel improvements in this art.

Weathervane Mountings

Standard weathervane mounting apparatus includes a roof mount that securely holds a vertical rod with an adjustable ring which sets the height of the vane location. Typically a small rod is secured over that vertical rod and the weathervane spins while riding on that small rod. Generally the vane includes—at the topmost position—a figure of a selected style that seats rotationally on a small ball which in turn sits upon a pair of right-angled directional arms—that is a pair of orthogonal arms showing "N-S-E-W". These directional arms ride in turn on a larger ball. Certain weather vanes—those which experience lift—have a U shaped lock to secure those mounted elements in place and to prevent them from becoming dislodged in a strong wind.

Environmental Concerns

Weathervane customers are design conscience. Often they want the interior of their homes and the exterior courtyards, fencing and home style features to portray a certain design theme. That theme—for some users—requires that an exterior decorative item, such a weathervane, should match—or at least be complimentary—to their particular design theme. On the exterior, a prominent design feature for certain types of homes is a weathervane itself or a cupola equipped with a matching weathervane. My resin weathervane invention yields a fine quality product that finishes in a variety of details, holds it color and is a compliment to a wide variety of decorative tastes for today's consumers.

Resin Weathervane Material

My resin weathervane includes a length of wet fiberglass that is impregnated with a liquid resin mixture, which mixture is wrapped around a steel rod or stiff supporting wire which is securely fastened at the end of a hollow upper rod. The rod—with mixture affixed—is, in turn, positioned near the balanced center of a weathervane decorative figurine. When the fiberglass/resin mixture has dried, the tube is firmly secured to the figurine and the support rod and fiberglass combination mixed with the resin makes the weathervane very strong. My resin figurine will then be safely supported on a spinning rod and can withstand strong winds encountered by the unit. The resin molds and finishes in fine detail and receives coloring as well. In short, it is a vast improvement over prior art vanes of conventional material.

BACKGROUND OF THE INVENTION

It is known in the weathervane field to layout particular designs according to the expected needs and desires of the end user. Often these layouts are shaped as figurines, mythical figures, common objects and/or animals. Popular materials used to form such weathervanes, prior to this invention, are copper or aluminum. Such metals are malleable, moldable and shape well.

Copper, in particular, can be formulated by skilled coppersmiths into very desirable decorative items. Coppersmith work is generally done at a metal shop, and is created mostly on a piece by piece basis. Such art in the shop often follow copyrighted sketches or plans selected to compliment the user's exterior theme.

Certain weathervane figures require geometric shapes that particularly lend themselves to the skill of a coppersmith. Circles, scrolls and intricate shapes may be achieved. Custom orders for Churches, Estates and the discriminating homeowner are available in both aluminum and copper. A wide selection of such weathervanes is shown on my web site of www.barharborweathervanes.com. The contents of my web site are hereby incorporated in full at this point as though such material were set forth herein.

While highly pleasing to the eye, copper weathervanes suffer from some drawbacks that detract from their overall consumer acceptance. Disadvantages exist both in fabrication and in installation. First the prior art coppersmith approach is time consuming and is relatively costly. Next, the bright copper color, of course, does not retain its finish. And over time, the "shiny" copper evolves into a patina that—to some consumers—is less than pleasing. Finally, and perhaps more important, is the attendant disadvantages of safety—both in use and in the manufacturing process.

At the coppersmith shop it is necessary for welding and tacking apparatus to be employed during the manufacturing process. Gloves and safety items are in high demand and must be used. Despite extreme care, copper metal is sharp and has ragged edges that can cut and harm those making or handling the products being fabricated. Additionally, the steps of welding, brazing and tacking can cause serious cuts, burns and other harmful injuries. Brazing and shaping also involves dangerous equipment and power apparatus for process steps together with the mandatory safety requirements dictated toward the safety of workers and helpers who may not be highly skilled in the copper working procedures.

When a copper weathervane is installed—despite great care in its manufacture—it is subject to violent forces of nature. Once installed on site, the wind has been known to tear copper weathervanes away from the mounting hardware. Then the copper weathervane itself becomes a dangerous flying missile. Winds in the neighborhood of over 50 to 60 miles per hour are now common in many parts of the world. Such winds place the copper weathervane in harms way, and it potentially may become a dangerous instrumentality when blown loose by such high winds.

All of these factors bring the safety and level of skill of the workers into play. In short summary, coppersmith cutting and shaping are all separate steps in a mostly drawn out and costly prior art approach.

FEATURES OF THE INVENTION

FIG. 1 is a simplified layout view in exploded form that depicts the typical mounting hardware used for installing a weathervane to a structure. The side notes are mostly self explanatory. In my resin weathervane invention the items mounted on the spindle and the decorative figure itself are made from a resin/fiberglass/supporting rod material in the manner described herein.

FIG. 2 includes FIGS. 2A through 2D which are simplified sketches depicting the steps of my method and apparatus invention. Additionally the wording provided with these figures explains the techniques employed in connection with one example of a resin rooster weathervane.

DETAILED DESCRIPTION OF THE INVENTION

For ease of presentation my invention has been shown and described as a resin weathervane system. I have tentatively adopted a trademark name for my invention. The one which I have coined and adopted is "V-Tech Weathervanes™". My intent herein is to describe and claim, as my invention, a weathervane that is made primarily from resin with certain parts as described herein being selected from metal or other suitable interchangeable materials.

Please see my FIG. 1 which shows an exploded view of a typical weathervane mounting having a simple arrow 100 affixed to a tube 104 as the vane figurine itself. My web site noted above shows a wide array of resin V-Tech™ figurines that I have prepared in accordance with my resin weathervane invention. With my invention, the weathervane arrow 100 and spin tube 104 ride on a spindle 115 that is normally employed on a post 130 that mounts a weathervane on a structure such as a roof or a cupola. Spin tube 104 may preferably be a hollow stainless steel tube that fits over a spindle 115 that is mounted in place to hold the weathervane in position.

Spindle 115 receives spacer balls 105, 106 and a set of directional arms (N, S, E, W) 125, which directional set 125 is fastened in the appropriate direction with tube 104 when 104 has been seated over spindle 115. The only part of a weathervane that turns is the arrow 100 and spin tube 104—or any selected figurine of many other vane decoration styles that are available. Directional set 125 and spacer balls 105 and 106 are mounted in a stationary position on tube 104 which in turn is seated over spindle 115.

Clearly, use of fiberglass and resin, in general, is a known art. In my invention, however, many decorative style weathervane structures themselves present a large area to the wind. Such styles require strengthening and reinforcing in order to withstand the high wind and natural forces such an implement faces in use. Take for example a rooster, a horse or a bear as among those having typically large surface areas for the vane symbol per se. Such vanes tend to suffer more in high winds. My resin weathervane invention achieves greater performance with little adverse affects from winds and storms during usage.

In my case, in a preferred embodiment, the locking clip 101 is used only for weathervanes that have an upward lift. Car or marine grease is placed on the spindle 115 in order to improve the turning of the vane proper. The smaller spacer ball 105 need not be mounted or secured to the post 104 it can just rest in place when assembled. Ring 118 can be adjusted up or down as required.

Weathervane spindle 115, FIG. 1, is about ⅝ inch in diameter and may be about ten inches long. Such a spindle amply supports most of the decorative styles of common weathervane designs/symbols which I refer to as figurines.

Figure 2A:
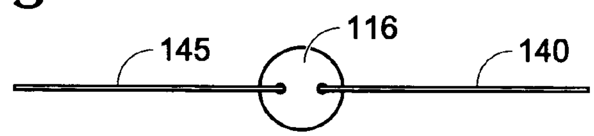

FIG. 2 includes FIG. 2A which depicts a top view looking down on a spin tube 104 that has a top cap 116 on the top end of tube 104. Top cap 116, FIG. 2A, seals the weathervane spin tube 104 and serves as a stop for the mounting spindle 115 when tube 104 is seated over spindle 115.

Figure 2B:
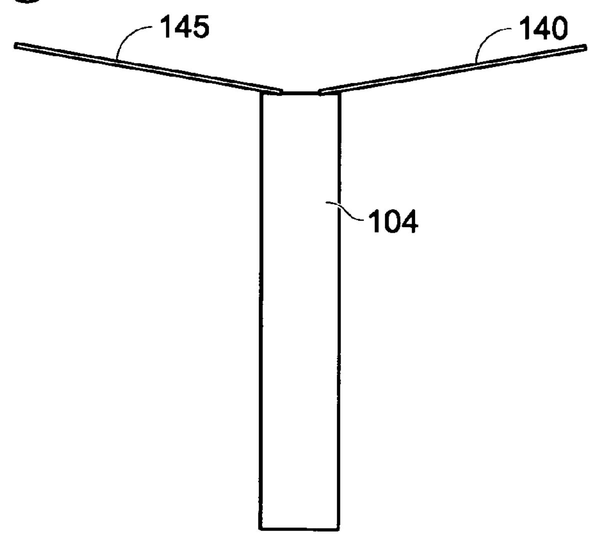

Top cap 116 of tube 115 is welded or otherwise affixed in place on the top of spin tube 104. Welded, or otherwise suitably attached to the top of cap 116, are a pair of support rods or stiff wires 140, 145. FIG. 2B shows such rods 140 and 145 in side view. Cap 116 thus serves as a weathervane rod stop and as a mounting surface for supporting rods 140 and 145.

Without top cap 116, the weathervane tube 104 would ride on the larger portion of the rod and have difficulty turning in the wind. By adding the top cap 116—weathervane 100 of FIG. 1 is free to turn in the wind with very little drag.

Figure 2C:
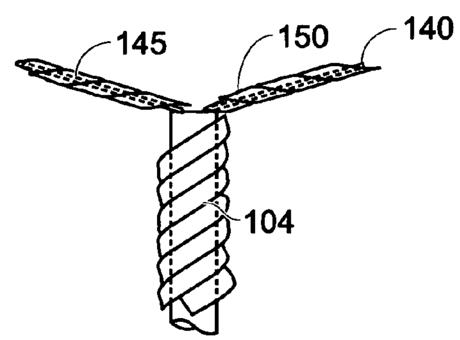
Figure 2D:
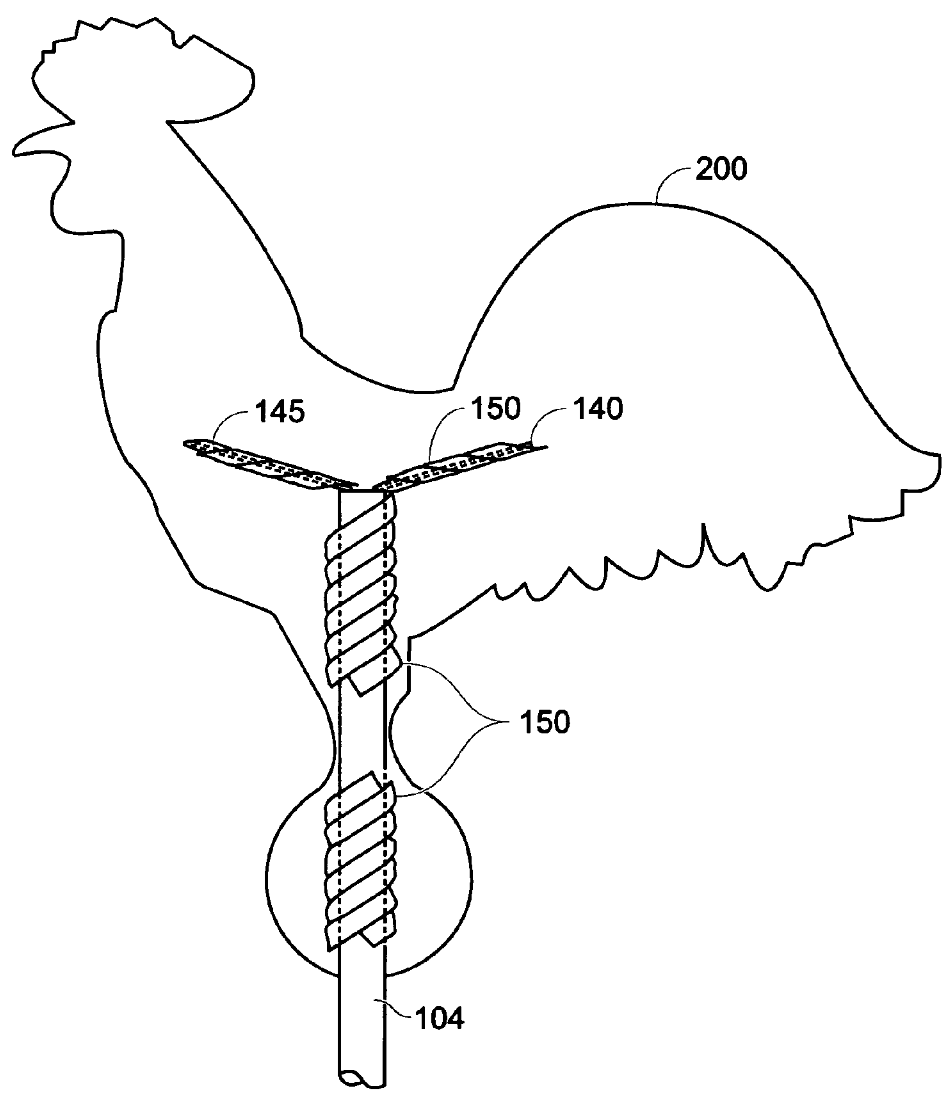

My method and the resulting novel apparatus is further described by additional reference to FIGS. 2B, 2C and 2D. In FIGS. 2C and 2D the thin ribbon-like lines are symbolic of a wet fiberglass belt 150 which is wrapped around the stiff stabilizing rods 140 and 145, the tube top 116 and the tube 104 itself. This fiberglass wrap 150 can be done at room temperature. It does not matter exactly how wide or long the fiberglass belt 150 is. Preferably, I use about a ¾" wrap which is about 24" long. Each time, however, the wrap 150 can be different—the fiberglass wrap 150 soaks up the resin in order to bind the figurine to the tube 104 when the resin itself "sets".

FIG. 2D depicts a rooster figurine 200 with a tube 104, wet fiberglass belt 150 and rod stabilizers 140 and 145 in place. In a rubber mold the fiberglass mixes with the resin pour and when dried or set makes a strong bond between all the named elements. Rubber molds are well known and no further description is believed necessary. A liquid pourable resin is used to form the rooster figurine 200 in the rubber mold. The stabilizing stiff wire or rods 140, 145, the fiberglass wrap 150 and resin mixture, when dried, forms the weathervane proper. The resulting weathervane is a sturdy and finely decorated figurine. It is an improvement in the weathervane art, and is a marked departure from the prior art.

When suitably mounted and in use, my resin weathervane will turn with the wind. Wind blowing from the North is referred to as a North Wind. Whether the figurine is a rooster 200, bear, horse or other design, the nose (or beak) is considered to be the pointer, and thus it is the heavier part of the vane that is spun by the wind into a North pointing direction. The nose always points with the wind direction since the mounting tube is placed slightly off center. The wind thus moves the heavier or larger portion of the figurine in the direction that the wind blows. In this example, that heavier portion is blown by the wind such that the rooster beak points North.

In my weathervane invention there is little fear of wind damage. The weight of the resin used in my various weathervane designs is generally speaking about 4-5 lbs per vane. Since the vanes are aero dynamic they will take strong winds. They literally glide in response to the wind direction. I have not experienced any significant wind damage with my resin weathervane invention.

Wire pieces 140 and 145 add additional strength for the tube 104 when mounted and encased within the vane's decorative figurine. Additionally, the wire rods helps support the tube in case the fiberglass wrap 150 on the tube 104 should start to fail. The fiberglass wrap 150 is an additional support to make the tube 104 stronger, like an extra beam in a home.

It does not matter if the wire 140, 145 is formed as a U or V shape. Indeed, a V may be preferred because this shape makes the weathervane product stronger for longevity purposes.

As far as the fiberglass wrap 150 is concerned, that fiberglass is wrapped everywhere on the tube 104 and rods 140 and 145. Then, when the resin is poured into my mold—the fiberglass mixes with the resin and together they make a secure bond with the tube 104. I prefer to have the stabilizing wires 140 and 145 welded to the top of the tube and extend upward from that location because it adds strength to the finished product. Moreover, the top of the tube 116 is a convenient place for the wire to be welded. The wire rods 140, 145 however, could be welded at other locations on the tube. My preferable welding place is the top of cap 116 for the reasons just given.

As a representative example, in one particular case the resin which forms the figurine is about ⅛th to ⅜ths thick at various points in the weathervane figurine. Each figurine has different thicknesses depending upon the particular design and contours of the figurine itself. The dried resin figurine, of course, can be painted as desired. In the molding operation very fine details of feathers, eyes, hairs and the like stand out in a pronounced manner in my resin weathervane invention.

The invention eliminates many expensive and time consuming coppersmith or aluminum casting operations of the prior art. Moreover, when finished and installed, my resin weathervane invention is sturdy, heavier and weather secure in its mounted position. It withstands violent wind and weather better than the prior art, and is much improved both from a decorative and functional standpoint.

According to my inventive concept, a simple room temperature operation is involved for my resin weathervane invention. A much improved fabrication time is involved. Moreover, the invention provides safety, durability and convenience both to the fabricator and the end user/customer. The invention thus provides many non obvious features and advantages over the prior art described above.

What is claimed is:

1. In an improved weathervane having a weathervane tube mounted within a resin weathervane figurine, the improvement comprising:

support rods coupled to the upper portion of the weathervane tube;

a wrap of fiberglass material wrapped at least partially around the tube and the stabilizing support rods; and a resin mixture poured into a mold to form a resin weathervane of a desired configuration which is bonded with said tube, said support rods and the fiberglass wrap.

2. The improved resin weathervane mounted on a spindle supported by a structure in accordance with claim 1 and further comprising;

a top cap seated on the upper end of the weathervane tube and serving as a stop bearing that allows the tube to spin freely about said spindle.

3. The improved weathervane in accordance with claim 2 and further comprising;

a pair of stiff support rods welded to the top cap with the length of said rods selected to nest within the particular figurine being molded for the weathervane proper.

4. The improved weathervane formed by said resin mixture that is poured into a rubber mold in accordance with claim 1 and further comprising;

said fiberglass wrap is in the form of a wet fiberglass belt of a given width and length that is wrapped around said support rods and said tube in order to form a strong bond between the tube, the support rods and the resin that fills said mold.

5. The improved weathervane in accordance with claim 1 and wherein said tube further comprises;

a hollow stainless steel tube chosen with an inside diameter to fit over said spindle and yet spin freely in the wind.

6. A method of forming an improved weathervane having a weathervane tube mounted within a resin weathervane figurine adapted to turn in the wind around a mounting spindle, the improvement comprising:

coupling stabilizing support rods to an upper portion of the weathervane tube;

wrapping a fiberglass material at least partially around the tube and the stabilizing support rods;

pouring a resin mixture into a mold containing said tube and support rods; and allowing said resin mixture to dry and thus form a resin weathervane of a desired configuration which has said dried resin bonded with said tube, said stabilizing support rods and the fiberglass material.

7. The method of forming a resin weathervane which is mounted on a spindle supported by a structure in accordance with claim 6 and further comprising;

seating a top cap over the upper end of the weathervane tube to serve as a stop bearing that allows the tube to spin freely about said spindle.

8. The method of forming an improved weathervane in accordance with claim 7 and further comprising;

selecting the length of said support rods to nest within the particular figurine being molded for the weathervane being formed; and welding said pair of stiff support rods to said top cap.

9. The method of forming an improved weathervane formed by said resin mixture that is poured into a rubber mold in accordance with claim 6 and further comprising;

fashioning said fiberglass wrap in the form of a fiberglass belt of a given width and length to be wrapped around said rods and said tube.

* * * * *